Patented Mar. 27, 1934

1,952,947

UNITED STATES PATENT OFFICE 1,952,947

BAKING POWDER

Carl Franz Heinrich Schott, Eberstadt, near Darmstadt, Germany

No Drawing. Application December 20, 1929, Serial No. 415,602. In Germany December 22, 1928

6 Claims. (Cl. 99—10)

It has for a long time been common practice to make bread, cakes or the like from a fine, white wheat flour which has been separated in a high degree from the coarser parts or bran; but within the last 20 to 30 years more and more notice has been taken of the fact that such a fine, white flour lacks constituents important to the consumer since these constituents are present mainly in the bran.

As long as about 80 years ago Liebig showed that very important constituents of the bran are in particular phosphoric acid salts of potassium and calcium which therefore should be present in the baked product. But until now it has not been possible to meet these demands.

Now I have found a way to offer both to the manual worker and to the mental worker a bread, cake or the like which has high nutritive and dietetic value and capable of strongly stimulating the functions of the body. For this purpose I make use of new baking powders, these being produced by means of potassium compounds or salts of alkaline character such as potassium carbonate, potassium bicarbonate or potassium percarbonate, either individually or mixed with each other, in conjunction with an acid compound and with special separating means, as, for instance, substances of an inorganic or organic nature which absorb water or humidity.

As filling materials, that is to say, materials for separating the ingredients and for making up the bulk of the baking powder, there may be used any that is suitable such as fine starch powder or fine wheat or maize flour. As a special separating means absorbing water or humidity may be named for instance, kieselguhr or lycopodium, or mixtures of such materials.

The composition of the baking powder, as to the nature, quality and quantity of the ingredients, may be varied to suit the nature of the flour in question or the baked product respectively, since a pure white flour may need a baking powder of a quality somewhat different from that to be used with a mixture of rye and wheat flour, or a dark rye flour, or wheat flour containing a considerable proportion of the external sheath of the grain is in question.

The new baking powders may affect the time occupied or the temperature of baking or both, and the steaming period, if this be necessary, may have to be correspondingly adjusted. The dough may be baked in tins, either covered or uncovered, or in loaf form.

In some cases it may be desirable to use the alkaline component in the baking powder in excess, varied according to the purpose in view, and such an excess may be particularly useful in the baking of bread or the like when a preliminary production of dough is adopted, such as a treatment of the dough at ordinary or raised temperature before introducing it into the proper baking oven.

The regulation and the control of the primary rising and of the subsequent rising of the dough may be secured as far as necessary by a suitable addition, for instance addition of calcium carbonate, of a secondary salt of phosphoric acid or the like.

The new baking powders may also contain, if desirable, other constituents as for instance suitable salts of iron, magnesium or lithium, or salts of silicic acid, imparting thus to the new baking powders, or to the baked products respectively, a further and special dietetic value. The gluten bread consumed by diabetic patients may be improved by use of the new baking powders.

The new baking powders may be used with other known baking powders, as well as with yeast or leaven.

The following examples may serve to illustrate my invention the parts being by weight:

(1) 300 parts of primary calcium phosphate: $Ca(H_2PO_4)_2$ are mixed with 300 parts of maize flour or fine wheat flour by means of a suitable machine, and 145 parts of secondary calcium phosphate (calcium phosphoricum siccum) are well mixed with about 100 parts of maize flour. After each of said mixtures has become homogeneous they are mixed together to form the calcium portion.

On the other hand 300 parts of well powdered potassium bicarbonate are thoroughly mixed with about 150 parts of maize flour or the like.

The potassium portion may be incorporated into the calcium portion as above prepared, the resulting mass being well stirred in a suitable mixer. The new baking powder thus obtained is adapted for the production of a very savoury bread from a fine wheat flour or for the baking of cakes, pastry or the like from such a flour.

(2) On the one hand 225 parts of acid sodium pyrophosphate are thoroughly mixed with about 200 parts of maize flour and on the other hand a mixture is prepared from 145 parts of calcium phosphoricum siccum and about 100 parts of maize flour.

These two portions are well mixed together and the resulting mass is added to a mixture of 300 parts of powdered potassium bicarbonate with about 200 parts of maize flour, the resulting mixture being stirred in the machine until uniformity is attained.

The new baking powder thus obtained may be used in baking bread or the like from a wheat flour.

(3) 175 parts of crystallized primary calcium phosphate are stirred, introduced in the mixing machine and therein mixed with about 60 parts of kieselguhr; uniformity being attained, about 280 parts of fine maize flour are added and the mixture well agitated in the machine. On the other hand 270 parts of potassium bicarbonate are poured in a suitable machine and mixed with about 280 parts of fine maize flour or the like. This potassium mixture may then be added to the calcium portion and the machine is allowed to work until a fine and homogeneous product is obtained. The process being finished, the powder is filled in cans or suitable crimped capsules, or otherwise packaged.

The new baking powder thus obtained may be preferably used for a dark rye or a dark wheat flour and serves also for mixtures of rye and wheat flour, as well as for a flour (rye or wheat) containing a considerable proportion of the external sheath of the grain.

In order to regulate the subsequent rising of the dough, if desired, the baking powder may be added, for instance, with a suitable proportion of calcium carbonate or secondary calcium phosphate. Furthermore suitable salts of magnesium or lithium may be added.

The foregoing examples relate to baking powders, but of course it is also possible to produce a "self-rising flour" by the present invention. For this purpose one may proceed as follows.

For instance, the mixture of 300 parts of primary calcium phosphate and of 145 parts of secondary calcium phosphate with 300 parts or 100 parts respectively of maize flour, compare Example 1, is well mixed with 15,000 parts of wheat flour; on the other hand also the potassium portion of Example 1 is mixed with 15,000 parts of wheat flour. These two portions are then mixed together and packaged.

As to the baking process it has already been stated that, for instance, time and temperature are to be adjusted according to the nature of the baking powder or to the nature of the flour in question.

For instance, 500 parts of sifted wheat flour are mixed with about 22 parts of the baking powder of Example 1, a suitable quantity of salt is added, and this mixture is mixed with about 130 parts of cold water into a smooth dough that can be handled. The dough is poured into a suitable tin, covered and baked about one hour in a hot oven (about heated to 200 to 250 degrees C.). It may be preferable to uncover the tin towards the end of baking.

It will be obvious to those skilled in the art that the present invention is not limited to the foregoing examples or modifications either in respect of the kind and proportions of the constituents or of the mode of preparation. Numerous variations, for instance, in respect of the kind of constituents and the mode of mixing them can be made without departing from the scope of the invention. Technical or medicinal purposes or points of view, for instance that of the sportsman, may determine more or less the modification adopted.

For instance, an organic acid compound or an organic acid may be substituted more or less for the inorganic acid compound, i. e. the phosphates, given in the examples.

As compounds of special nutritive-dietetic value, suitable salts of magnesium or lithium may be named here.

As to the baking process it is clear that it is not possible and not necessary to give a specific example for every kind of wheat or rye flour; it is well known that there are, for instance, so-called hard and soft wheats or wheat flours, so that in baking with such different kinds of flour many alterations may be made without exceeding the bounds of the inventive idea in order to obtain the best results.

Having now described my invention and the manner in which it may be performed what I claim is,—

1. As a new article of manufacture, a baking powder comprising a potassium carbonate, an acid phosphate of calcium, kieselguhr and a fine flour.

2. As a new article of manufacture a baking powder comprising potassium bicarbonate, primary calcium phosphate, kieselguhr and a fine flour.

3. As a new article of manufacture a baking powder comprising potassium bicarbonate, primary calcium phosphate, secondary calcium phosphate, kieselguhr and a fine flour.

4. As a new article of manufacture a baking powder comprising a potassium carbonate, a primary or secondary phosphate of an alkaline earth metal, an organic filling material, kieselguhr and a salt of an alkali metal.

5. As a new article of manufacture a baking powder comprising potassium bicarbonate, an acid calcium phosphate, a magnesium phosphate, a fine flour, kieselguhr and an alkali metal salt.

6. As a new article of manufacture a baking powder comprising potassium bicarbonate, primary calcium phosphate, secondary calcium phosphate, a magnesium phosphate, a fine flour, kieselguhr and a lithium salt.

CARL FRANZ HEINRICH SCHOTT.